(12) United States Patent
Sable et al.

(10) Patent No.: US 12,001,503 B2
(45) Date of Patent: Jun. 4, 2024

(54) SYSTEM AND METHOD FOR DELIVERING APPLICATION METADATA

(71) Applicant: ServiceNow, Inc., Santa Clara, CA (US)

(72) Inventors: Kapeel Sharadrao Sable, San Diego, CA (US); Carl Solis, Purcellville, VA (US); Bojan Beran, Carlsbad, CA (US); Kyle James Barron-Kraus, East Lansing, MI (US)

(73) Assignee: ServiceNow, Inc., Santa Clara, CA (US)

( * ) Notice: Subject to any disclaimer, the term of this patent is extended or adjusted under 35 U.S.C. 154(b) by 16 days.

(21) Appl. No.: 17/591,354

(22) Filed: Feb. 2, 2022

(65) Prior Publication Data

US 2023/0244740 A1  Aug. 3, 2023

(51) Int. Cl.
*G06F 16/957* (2019.01)
*H04L 67/02* (2022.01)

(52) U.S. Cl.
CPC .......... *G06F 16/9574* (2019.01); *H04L 67/02* (2013.01)

(58) Field of Classification Search
CPC .............................. G06F 15/9574; H04L 67/02
See application file for complete search history.

(56) References Cited

U.S. PATENT DOCUMENTS

| | | |
|---|---|---|
| 6,321,229 B1 | 11/2001 | Goldman et al. |
| 6,609,122 B1 | 8/2003 | Ensor |
| 6,678,887 B1 | 1/2004 | Hallman |
| 7,020,706 B2 | 3/2006 | Cates et al. |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,249,219 B1 * | 7/2007 | Mowat ................ G06F 12/0813 711/113 |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky et al. |
| 7,769,718 B2 | 8/2010 | Murley et al. |
| 7,783,744 B2 | 8/2010 | Garg |
| 7,890,802 B2 | 2/2011 | Gerber |
| 7,925,981 B2 | 4/2011 | Pourheidari et al. |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |

(Continued)

*Primary Examiner* — Andrew C Georgandellis
(74) *Attorney, Agent, or Firm* — FLETCHER YODER PC

(57) ABSTRACT

A server receives a first hypertext transfer protocol (HTTP) from a client device requesting for content associated with a webpage. The server retrieves a plurality of cache keys associated with respective sets of application metadata identified in the first HTTP request from an application metadata database and transmits the cache keys to the client device. The server receives a second HTTP request from the client device identifying one or more cache keys that are not stored in a local HTTP cache of the client device. The server device retrieves the sets of application metadata corresponding to the missing cache keys from the application metadata database and transmits the application metadata to the client device.

20 Claims, 7 Drawing Sheets

(56) References Cited

U.S. PATENT DOCUMENTS

| | | |
|---|---|---|
| 8,151,261 B2 | 4/2012 | Sirota et al. |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon et al. |
| 8,646,093 B2 | 2/2014 | Myers et al. |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller et al. |
| 8,887,133 B2 | 11/2014 | Behnia |
| 8,983,982 B2 | 3/2015 | Rangarajan |
| 9,065,683 B2 | 6/2015 | Ding |
| 9,065,783 B2 | 6/2015 | Ding et al. |
| 9,098,322 B2 | 8/2015 | Apte et al. |
| 9,122,552 B2 | 9/2015 | Whitney et al. |
| 9,239,857 B2 | 1/2016 | Trinon |
| 9,317,327 B2 | 4/2016 | Apte |
| 9,363,252 B2 | 6/2016 | Mueller et al. |
| 9,508,051 B2 | 11/2016 | Falk |
| 9,535,674 B2 | 1/2017 | Cooper |
| 9,535,737 B2 | 1/2017 | Joy |
| 9,557,969 B2 | 1/2017 | Sharma |
| 9,645,833 B2 | 5/2017 | Mueller et al. |
| 9,766,935 B2 | 9/2017 | Kelkar et al. |
| 9,792,387 B2 | 10/2017 | George |
| 9,805,322 B2 | 10/2017 | Kelkar |
| 10,521,195 B1 | 12/2019 | Swope et al. |
| 10,673,971 B1* | 6/2020 | Hindanov ............... H04L 67/56 |
| 11,032,213 B1 | 6/2021 | Hussain et al. |
| 2008/0104198 A1* | 5/2008 | Kamath .............. G06F 16/9574 709/213 |
| 2016/0034434 A1* | 2/2016 | Guerrier ............... G06F 16/972 715/234 |
| 2019/0196789 A1 | 6/2019 | Bucchi et al. |
| 2019/0196890 A1 | 6/2019 | Bucchi et al. |
| 2019/0332451 A1 | 10/2019 | Tamjidi et al. |
| 2019/0340287 A1 | 11/2019 | Tamjidi et al. |
| 2020/0089478 A1 | 3/2020 | Nelson et al. |
| 2020/0341994 A1 | 10/2020 | Tamjidi et al. |
| 2020/0389543 A1 | 12/2020 | Swope et al. |
| 2021/0173888 A1 | 6/2021 | Flack et al. |
| 2021/0248114 A1 | 8/2021 | Tamjidi et al. |

\* cited by examiner

SYSTEM AND METHOD FOR DELIVERING APPLICATION METADATA

BACKGROUND

The present disclosure relates generally to delivering webpage or application content to a client device across a network, and more specifically to delivering application metadata for a webpage or application.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

When a user navigates within a web browser or native application running on a network-connected client device, application data and application metadata are provided to the client device across a network so the client device can render the web page or application. As webpage and application design becomes more complex, the amount of application metadata being provided along with application data is increasing. Accordingly, content may be slower to load as the increased amount of application metadata is transmitted across the network. Further, large amounts of application metadata being transmitted across a network may burden the network and slow data transmission speeds across the network. Accordingly, a more efficient way to deliver application metadata to a client device is desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure provides improved techniques for delivering application metadata to a client device across a network. Application metadata may be stored in a database on one or more servers connected to a computing network. The application metadata may be broken up into sets, with each set having a respective cache key that identifies the particular version or iteration of the application metadata set. When a user navigates to a webpage or an application via a browser of a client device connected to the network, the client device sends a Hypertext Transfer Protocol (HTTP) request to the server for the application data and application metadata associated with the webpage or application. The server identifies the application metadata referenced in the HTTP request, retrieves the corresponding cache keys from the application metadata database, and transmits the cache keys to the client device. The client device compares the received cache keys to cache keys stored in a local HTTP cache and identifies any received cache keys that are missing from the local HTTP cache. If all of the cache keys are found in the local HTTP cache, then no additional metadata needs to be fetched. Meanwhile, the server identifies the application data referenced in the HTTP request, retrieves the corresponding application data from an application data database, and provides the retrieved application data to the client device. If any of the received cache keys are missing from the local HTTP cache, the client device sends a second HTTP request to the server requesting the application metadata associated with the identified cache keys not found in the local HTTP cache. The server retrieves the application metadata corresponding to the cache keys not found in the local HTTP cache from the application database server and transmits the application metadata to the client device. The client device then renders the webpage or application based on the received application data and the application metadata associated with the received cache keys.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
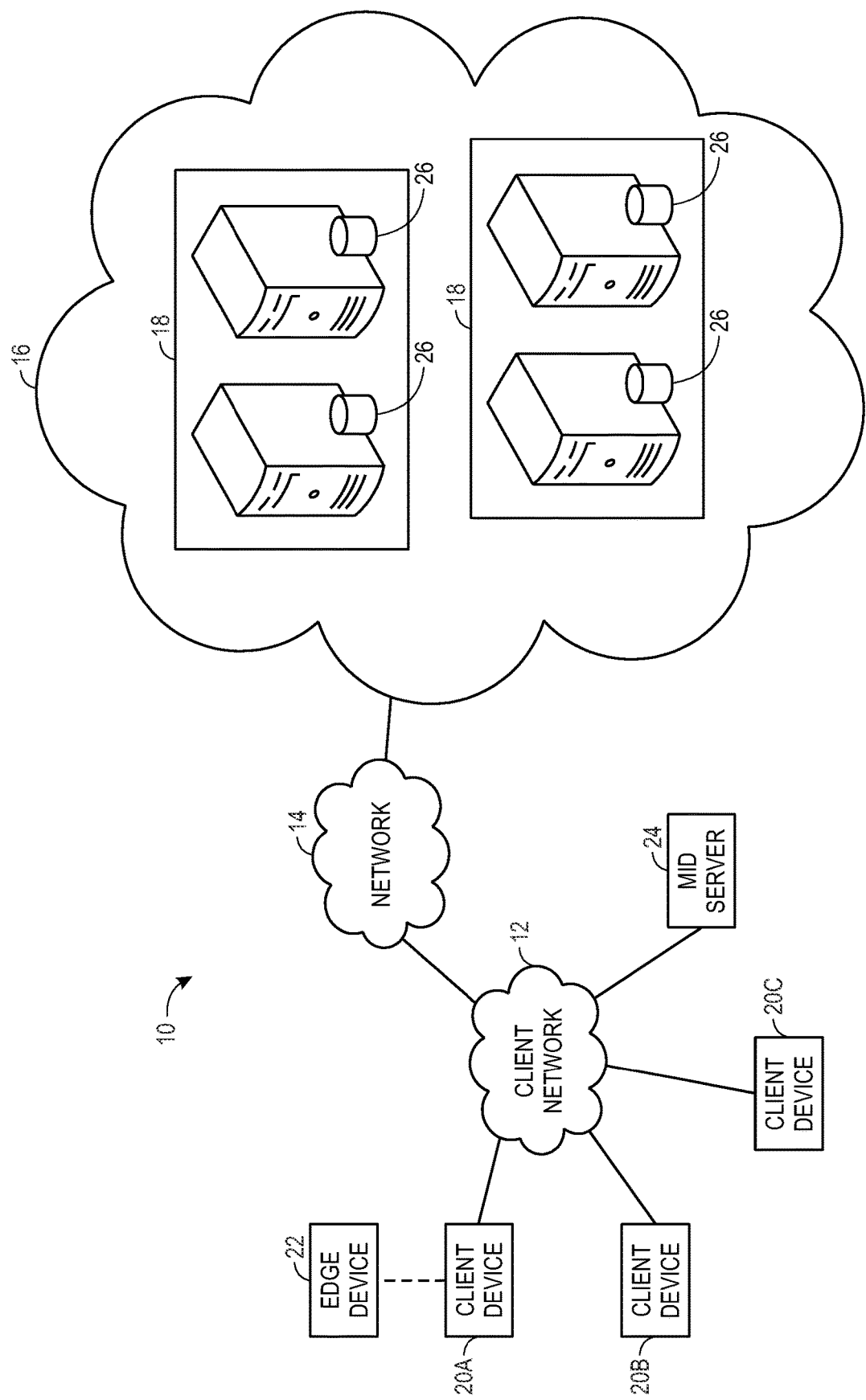
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

The present disclosure provides improved techniques for delivering application metadata to a client device across a network. When a user navigates to a webpage or an application via a browser of a client device connected to the network, the client device requests application data and application metadata associated with the webpage or application from the server. The application metadata is stored on the server and broken up into sets, with each set having a respective cache key that identifies the particular version or iteration of the application metadata set. The server transmits the cache keys associated with the requested application metadata to the client device. The client device identifies any received cache keys that are missing from the local HTTP cache and requests application metadata associated with the missing cache keys from the server. If all of the cache keys are found in the local HTTP cache, then no additional metadata needs to be fetched. Meanwhile, the server retrieves the requested application data and provides it to the client device. The server retrieves the application metadata corresponding to the missing cache keys transmits the application metadata to the client device. The client device then renders the webpage or application based on the received application data and the application metadata associated with the received cache keys.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server(s) and dedicated database server(s). In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
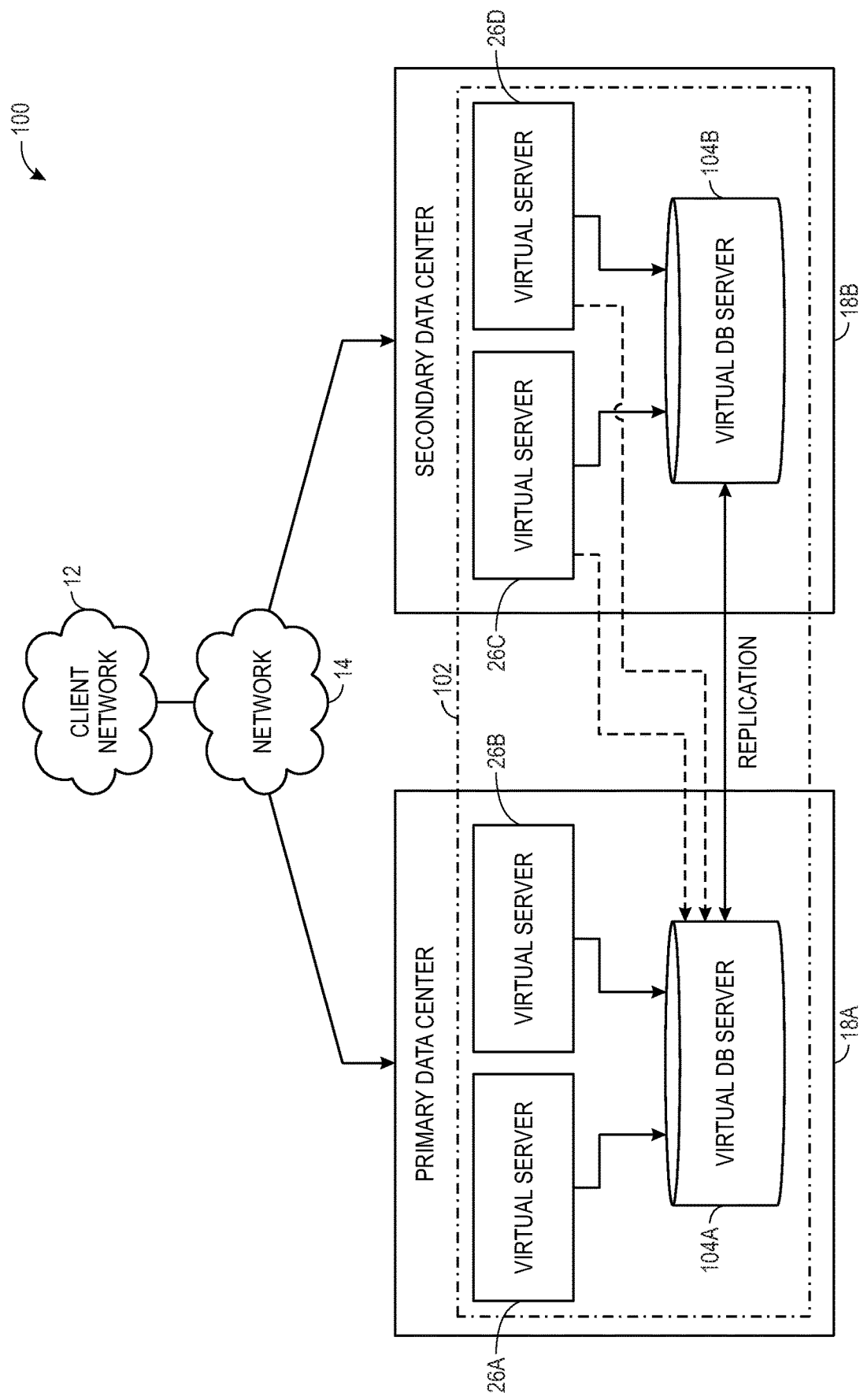
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another and provide data replication and/or failover capabilities. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
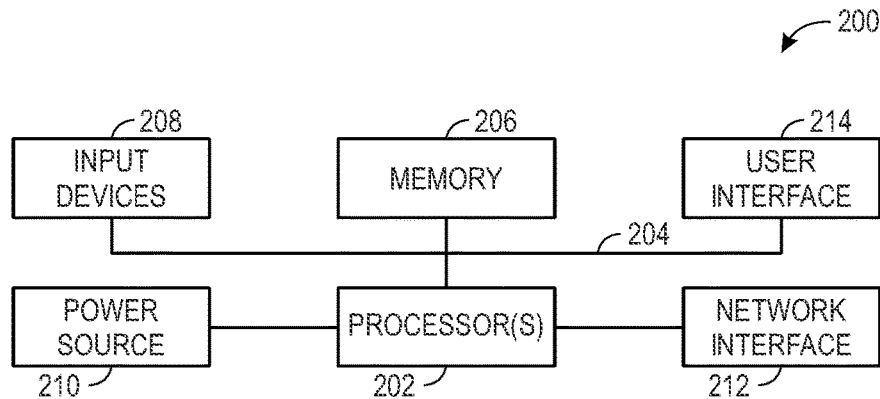
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
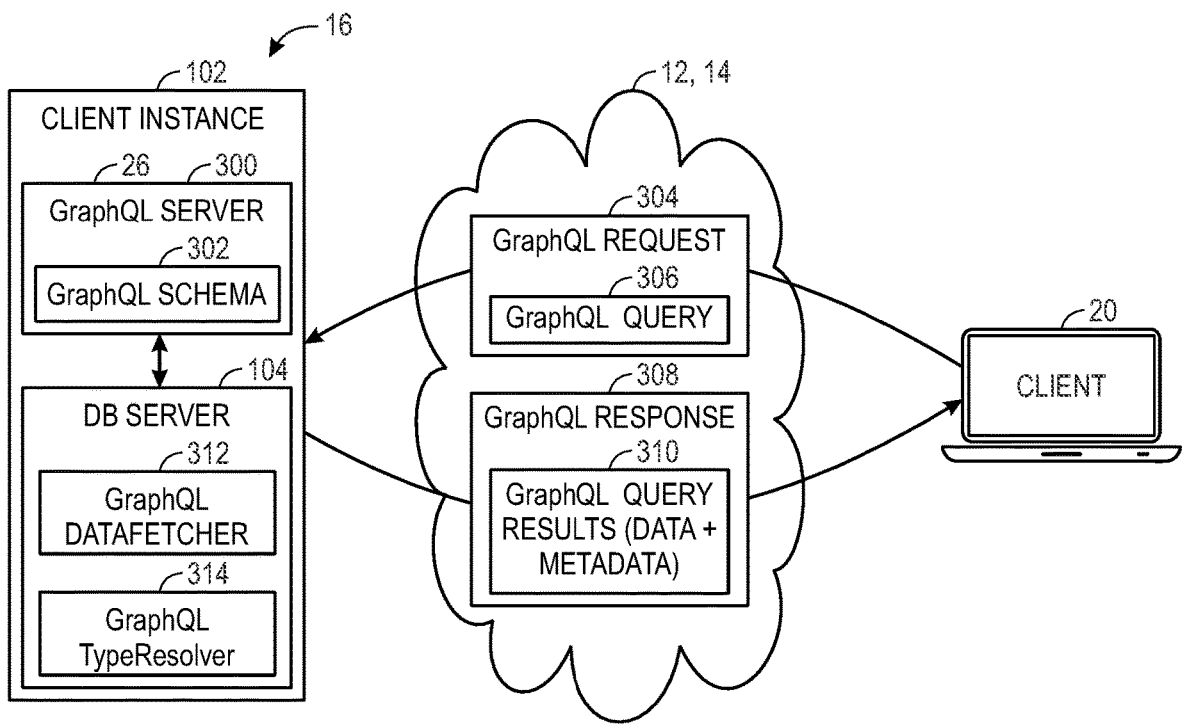
FIG. 4 is a block diagram illustrating a virtual server and a database server supporting and enabling a client instance, according to one or more disclosed embodiments, in accordance with aspects of the present disclosure.

With the preceding in mind, FIG. 4 is a block diagram illustrating an embodiment in which a virtual server 26 and a database server 104 support and enable the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the networks 14 and 12 to provide a user interface to network applications executing within the client instance 102 (e.g., via a web browser running on the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device(s) 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

More specifically, the virtual server 26 of the illustrated client instance 102 includes a GraphQL server 300 that hosts a GraphQL schema 302 that describes data stored by the database server 104. The GraphQL server 300 is generally designed to receive a GraphQL request 304 that includes one or more GraphQL queries 306, and then to execute the received queries against the GraphQL schema 302 to retrieve data from the database server 104. In response to executing the received GraphQL query 306, the GraphQL server 300 is designed to generate a corresponding GraphQL response 308 that includes GraphQL query results 310, which are returned to the requesting device (e.g., client device 20). While the GraphQL request 304 is indicated as being received from the client device 20 for the illustrated embodiment, in other embodiments, the GraphQL request 304 may be received from an application hosted by another virtual server 26 of the client instance 102, from the GraphQL server 300 itself, or another suitable device.

Additionally, for the embodiment illustrated in FIG. 4, the database server 104 stores one or more GraphQL data-handling script tables, such as a GraphQL DataFetcher table 312 that is designed to store custom data-fetching scripts to retrieve and/or generate certain pieces of data within a GraphQL schema, as well as a GraphQL TypeResolver table 314 that is designed to store custom type-resolving scripts to determine the data type of fields of the GraphQL schema. It may be appreciated that the illustrated examples of GraphQL data-handling script tables is not intended to be limiting. Indeed, custom data-handling scripts can be defined to analyze, retrieve, and/or generate data pertaining to, or defined by, the GraphQL schema 302.

As shown in FIG. 4, GraphQL responses 308 may include application data and application metadata. Accordingly, if a large number of requests 304 are being transmitted across a network 12, 14, and/or the query results 310 include large data sets, applications may be slow to load as a request 304 is sent and a response 308 is received. Further, large amounts of data being transmitted across the network 12, 14 may burden the network and slow data transmission speeds across the network 12, 14. Accordingly, it may be advantageous to cache received data and application metadata locally such that when a user navigates to a webpage or an application a subsequent time, some or all of the data and application metadata associated with the webpage or an application may be retrieved from a local cache and does not have to be fetched across the network 12, 14. The data transmitted with the query results 310 is generally considered to be static or persistent data that is infrequently changed, so typical caching techniques using time stamps and so forth may be used to cache the data and manage the cached data. However, the application metadata transmitted with the query results 310 is considered to be dynamic data in that it is updated regularly and changes asynchronously over time as new data becomes available. Accordingly, known caching techniques may not be usable for caching the application metadata and managing the cached data. The presently disclosed embodiments utilize techniques for caching dynamic application metadata in order to reduce network traffic and increase page loading speed.

Figure 5:
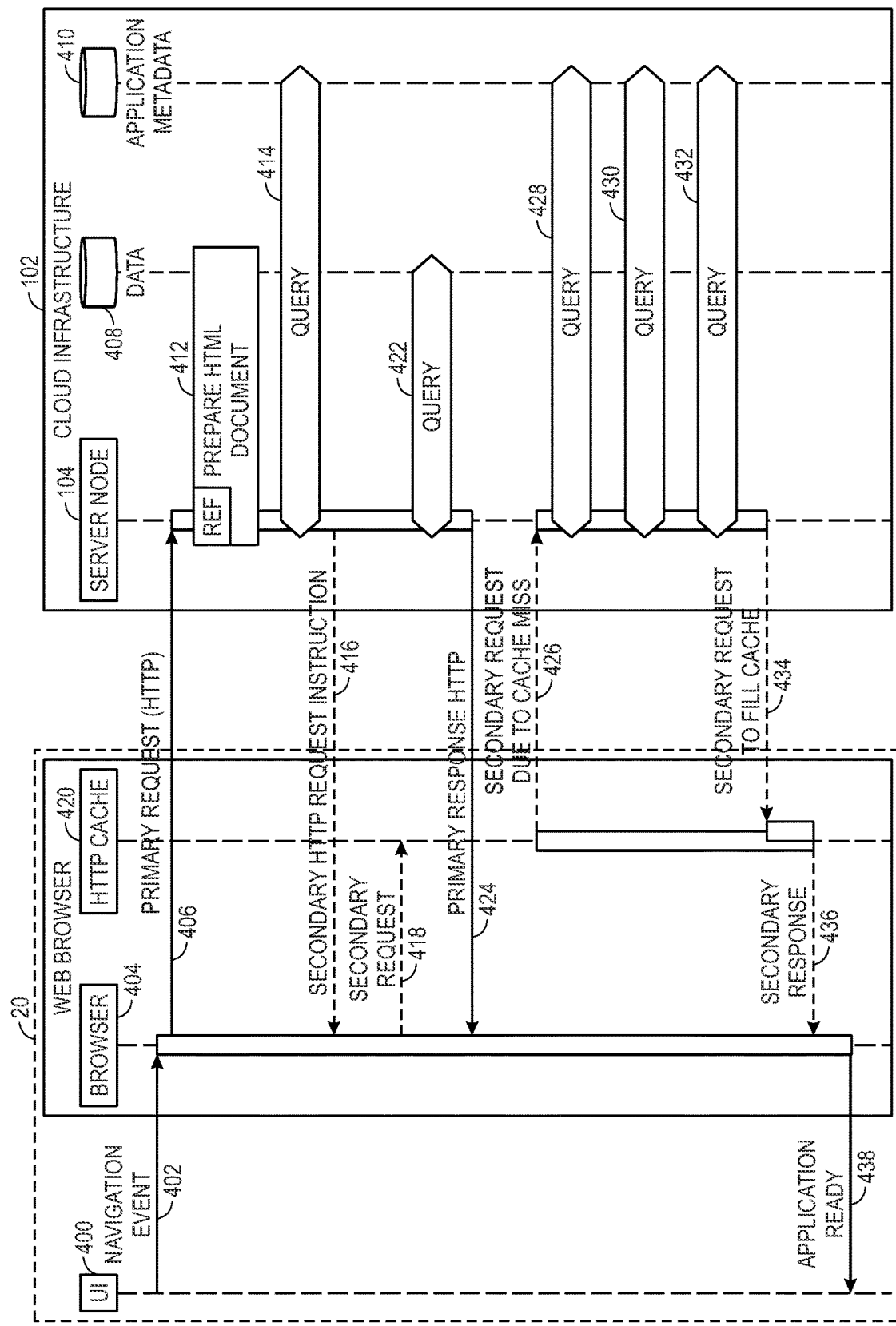
FIG. 5 is a flow diagram illustrating a client device navigating to a webpage or part of an application, in accordance with aspects of the present disclosure.

FIG. 5 is a flow diagram illustrating a process that occurs when the client device 20 navigates to a webpage or part of an application. In order to simplify the description, present embodiments are described as a user navigating to and interacting with a webpage. However, it should be understood that embodiments are also envisaged in which the same techniques are used when a user navigates to, navigates within, or otherwise interacts with, a native software application, a mobile application, a web application, and so forth. Accordingly, the disclosed techniques are not intended to be limited to use with a traditional webpage accessed via a web browser. A user input provided via a user interface (UI) 400 of the client device 20, such as clicking on a hyperlink, selecting a navigation button, providing a uniform resource locator (URL), providing a character string to a search bar, and so forth causes the UI 400 to transmit a navigation event 402 to a browser 404. The browser 404 generates and transmits a Hypertext Transfer Protocol (HTTP) request 406 (e.g., a GraphQL request) to a database server 104 that stores, or otherwise has access to, a data database 408 and an application metadata database 410. Though FIG. 5 illustrates the client device 20 interacting with the database server 104, in some embodiments, the GraphQL server 26 shown in FIG. 4 may act as an intermediary between the client device and the database server, as was described with regard to FIG. 4. In embodiments in which the database server 104 has access to the data database 408 and the application metadata database 410, the data database 408 and the application metadata database 410 may be stored on one or more remote servers, accessible by the database server 104 via a network or the internet.

The data database 408 may store data used to render the webpage. For example, the data database 408 may store images to be displayed, text to be displayed, data to be displayed and/or referenced by the data defining how the page is organized, code and/or scripts that are executed when the webpage is rendered, displayed, or interacted with, various files utilized by the webpage, and so forth.

The application metadata database 410 may store application metadata associated with the webpage. In some embodiments, the application metadata may be data that captures information about data stored in the data database 408. For example, the application metadata stored in the application metadata database 410 may include user profile data, file version history, authors/contributors that modified data, timestamps for when data was created/modified, data size, data format, data structure, access policies/preferences, and so forth.

Upon receipt of the primary HTTP request 406, the database server 104 prepares a hypertext markup language (HTML) document 412 that may be sent to the client device via one or more HTTP responses (e.g., GraphQL responses). The HTML document 412 is eventually provided to the browser 404 and defines how the browser 404 renders the webpage. The database server 104 identifies the application data and application metadata to be fetched to render the webpage and separates the HTTP request 406 (e.g., GraphQL request) into a primary request that includes a request for application data and a secondary request that includes a request for application metadata. At 414, the database server 104 queries the application metadata database 410 based on the secondary request and retrieves one or more cache keys associated with application metadata identified in the secondary request. Cache keys are values that identify particular versions of sets of application metadata stored in the application metadata database 410. For example, in some embodiments, the cache keys may include hash values, hash codes, or hashes that are generated by a hash function when a set of application metadata is updated. For example, when a set of application metadata is initially stored, updated, changed, or revised, a hash function may be applied to generate a cache key (hash value), which may be stored in a hash table within the application metadata database 410. Accordingly, the cache keys may be alphanumeric character strings generated by the hash function and may be of fixed or varying length. Accordingly, each cache key references a particular version or iteration of a set of application metadata stored in the application metadata database 410. The cache key may be used to identify and retrieve a particular version or iteration of a set application metadata stored in the application metadata database 410 and identify whether or not that version or iteration of the set of application metadata is still valid.

As described above, application metadata is typically considered to be "dynamic" because application metadata is typically updated frequently and changes asynchronously over time as new data becomes available. Accordingly, known caching techniques are not particularly well suited for use with application metadata. However, the present techniques treat application metadata as static data that is updated periodically. For example, by generating a new cache key when a set of application metadata is updated, cache keys can be used to identify and distinguish between iterations of sets of application metadata. Accordingly, cache keys for application metadata stored in a cache can be compared to cache keys for application metadata stored in the application metadata database 410 to determine whether the application metadata stored in the cache is still valid. Only when the locally cached or otherwise stored application metadata is no longer valid doe the current or updated application metadata need to be fetched. Though application metadata caching typically takes place on the server side (e.g., database server 104), the present techniques allow for application metadata to be cached locally on the client side (e.g., client device 20). The client device 20 and the database server 104 may then exchange cache keys, which are smaller in file size than the associated application metadata, to determine validity of the application metadata stored in the local cache on the client device 20 and identify what application metadata, if any, needs to be fetched from the database server 104. Accordingly, if application metadata is needed to render a webpage and the application metadata stored in the local cache is still valid, the application metadata can be retrieved from the local cache to render the webpage. Alternatively, if some of the application metadata stored in the local cache is not valid, then only the application metadata that is no longer valid is fetched from the database server 104, while valid application metadata can be retrieved from the local cache to render the webpage. In some embodiments, heuristics of JavaScript Object Notation (JSON) may be used to exchange cache keys and/or to coordinate caching. For example, HTTP responses with application metadata may include a World Wide Web Consortium (W3C) caching header with instructions to cache application metadata and retrieve the application metadata from the cache rather than fetching the application metadata in the future.

In the present embodiment, individual cache keys correspond to relatively small portions of application metadata, allowing for a fine level of granularity when determining what application metadata stored in the local cache is valid and what application metadata in the local cache is no longer valid and will be re-fetched. For example, sets of application metadata may correspond to individual users, types of users, user roles, etc. In other embodiments, application metadata may be separated into sets based on associated types of applications (e.g., book keeping/accounting, project management, word processing, time keeping, design, procurement, etc.), specific applications, specific files, groups of files, etc. In further embodiments, the application metadata may be separated based on size, such that a set of application metadata must be below some upper threshold and/or above some lower threshold size. In other embodiments, the application metadata may be separated based on time (e.g., time created, time modified, time retrieved, time accessed, etc.). Further, application metadata may be separated based on files or applications accessed or accessible by particular users, particular types of users, or users having a particular role. In some embodiments, the application metadata caching techniques may be "session aware" such that application metadata associated with particular users or users having particular roles is associated with different respective cache keys such that if application metadata changes for a particular user or user role, application metadata for other users/roles remains valid and does not need to be re-fetched in order to render the webpage for those unaffected users or users with unaffected roles. Accordingly, application metadata only needs to be re-fetched for the particular user or users having the particular role for which the application metadata changed. Along these lines, application metadata may be grouped and associated with cache keys to cluster related application metadata or application metadata that tends to be updated together in order to reduce or minimize instances of cached application metadata being invalidated by updates. In this fashion, in some embodiments, rules may be applied to cluster application metadata and associate clusters of application metadata with cache keys. Further, in some embodiments, machine learning (e.g., a trained neural network) may be applied to monitor the application metadata being stored over time and make adjustments to the application metadata clusters or adjust the rules used to cluster application metadata in order to reduce or minimize instances of caches being invalidated by updates to application metadata.

At 416, the database server 104 transmits, via the HTTP response (e.g., GraphQL response), the retrieved cache keys to the browser 404 of the client device 20. At 418, the browser 404 compares the received cache keys to cache keys stored in a local HTTP cache 420. If the received cache keys are found in the local HTTP cache, the application metadata corresponding to the matching cache keys does not need to be re-fetched because the application metadata stored in the local HTTP cache is valid. However, if one or more of the received cache keys are not found in the local HTTP cache, then some or all of the application metadata stored in the local HTTP cache is not valid and the application metadata corresponding to the unmatched cache keys is not stored in the local HTTP cache. Accordingly, the application metadata corresponding to the received cache keys not found in the local HTTP cache needs to be fetched from the database server 104.

At 422, the database server 104 queries the data database 408 to retrieve data associated with the primary HTTP request. The data may include, for example, stored images to be displayed, text to be displayed, data to be displayed and/or referenced by the webpage, data defining how the page is organized, code and/or scripts that are executed when the webpage is rendered, displayed, or interacted with, various files utilized by the webpage, and so forth. At 424, the retrieved data is transmitted to the browser 404 as the primary HTTP response to the primary HTTP request.

At 426, the browser 404 transmits the secondary HTTP request to the database server 104 for the application metadata associated with the cache keys that were missing from the HTTP cache 420. The database server 104 retrieves the application metadata associated with the cache keys that were missing from the HTTP cache 420 by transmitting one or more queries 428, 430, 432 to the application metadata database 410. The database server 104 identifies the associated application metadata within the application metadata database 410 using the cache keys that were missing from the HTTP cache 420. For example, the database server 104 may reference a hash table to identify and locate the sets of application metadata associated with the received cache keys. Once the application metadata associated with the received cache keys has been located, the database server 104 can retrieve the application metadata from the identified location. At 434, the database server generates the secondary HTTP response based on the query results received from the application metadata database 410, including the application metadata and cache keys, and transmits the secondary HTTP response (e.g., GraphQL response) to the web browser 404 of the client device. The web browser 404 populates the cache with the data received in the secondary HTTP response. At 436, the browser 404 retrieves all of the application metadata associated with the secondary HTTP request. At 438, the browser 404 renders the application or webpage on the UI 400 using the data from step 424 and the application metadata from step 436.

Figure 6:
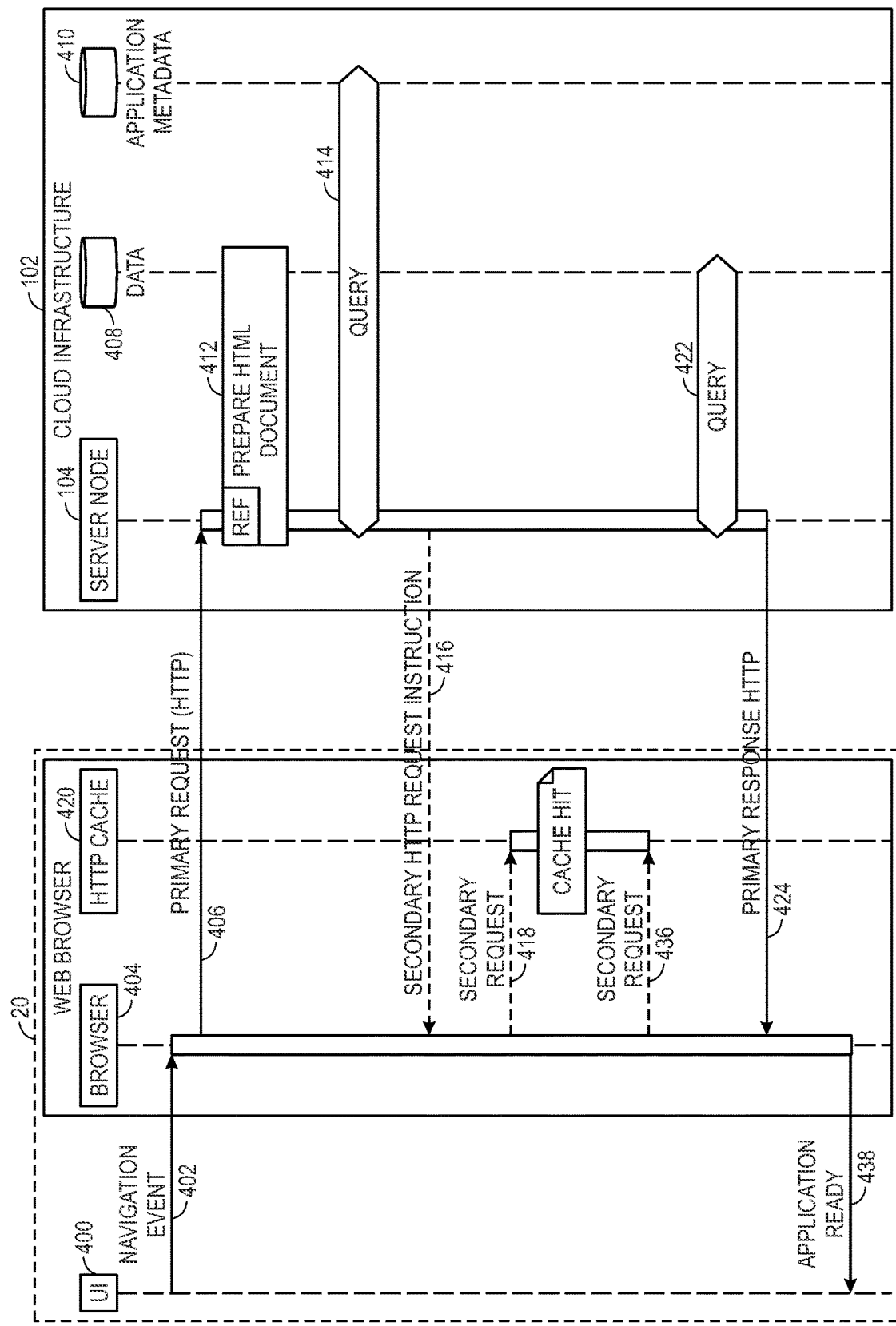
FIG. 6 is a flow diagram illustrating the client device navigating to the webpage or the part of the application a subsequent time, in accordance with aspects of the present disclosure.

FIG. 6 is a flow diagram illustrating a process that occurs when the client device 20 navigates to the webpage a subsequent time after the flow diagram of FIG. 5 has been completed during a first visit. A user input provided via the UI 400, such as clicking on a hyperlink, selecting a navigation button, providing a URL, providing a character string to a search bar, and so forth causes the UI 400 to transmit a navigation event 402 to the browser 404. The browser 404 generates and transmits an HTTP request 406 (e.g., GraphQL request) to the database server 104 for the data associated with the webpage. Upon receipt of the HTTP request 406, the database server 104 separates the HTTP request into a primary HTTP request for data and a secondary HTTP request for application metadata. The database server 104 prepares an HTML document 412 that defines how the browser 404 renders the webpage.

At 414, the database server 104 queries the application metadata database 410 based on the secondary HTTP request and retrieves one or more cache keys associated with application metadata identified in the secondary HTTP request. In some embodiments, the database server may use a hash table to identify the cache keys that correspond to the identified application metadata. At 416, the database server 104 transmits the retrieved cache keys to the browser 404 of the client device 20. At 418, the browser compares the received cache keys to cache keys stored in the local HTTP cache 420. If the received cache keys are found in the cache, the application metadata stored in the local HTTP cache is valid and the application metadata corresponding to the matching cache keys does not need to be fetched from the database server 104. If all of the received cache keys are found in the local HTTP cache 420, all of the associated application metadata can be retrieved from the local HTTP cache 420 and no application metadata needs to be fetched from the database server 104. However, if any of the received cache keys are not found in the local HTTP cache 420, then application metadata associated with the missing cache keys is fetched from the database server 104, as shown and described with regard to steps 426, 428, 430, 432, 434, and 435 of FIG. 5.

At 422, the database server 104 queries the data database 408 to retrieve data associated with the primary HTTP request. At 424, the retrieved data is transmitted to the browser 404 as the primary HTTP response to the primary HTTP request. At 438, the browser 404 renders the application or webpage on the UI 400 using data from the primary HTTP response 424 (e.g., GraphQL response) and application metadata from the cache identified by the cache keys included in the secondary HTTP response 436 (e.g., GraphQL response).

Figure 7:
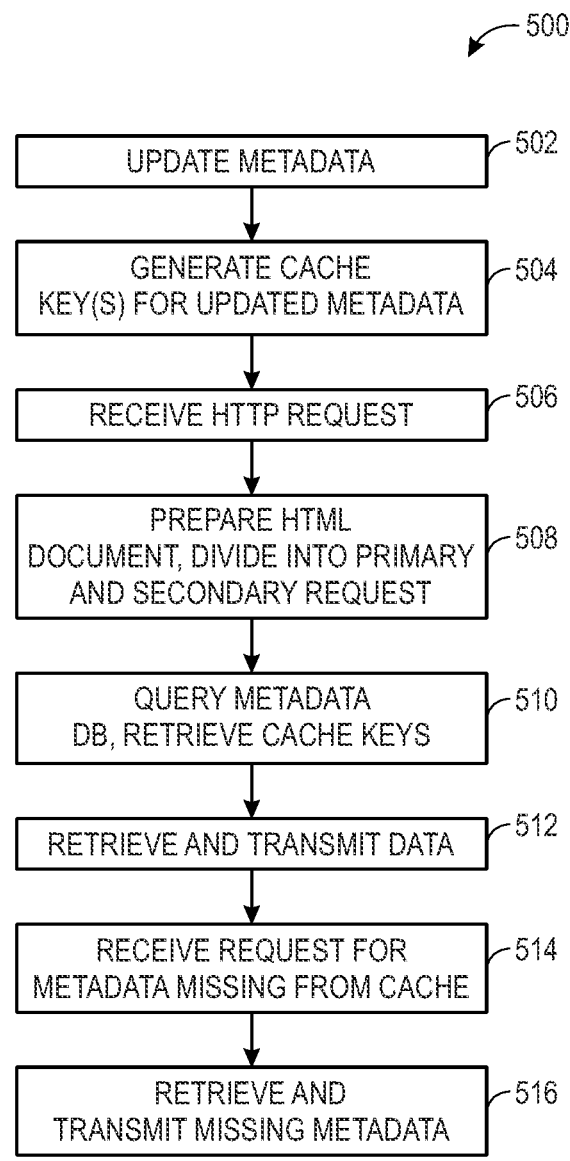
FIG. 7 is a flow chart of a process for managing and delivering application metadata from the perspective of a server, in accordance with aspects of the present disclosure.

FIG. 7 is a flow chart of a process of managing and delivering application metadata from the perspective of a computing device located server side (e.g., database server 104 shown in FIGS. 3 and 4-6). At block 502, the database server receives or generates application metadata or an update to application metadata stored in the application metadata database and adds the new application metadata or updates the application metadata stored in the application metadata database according to the update. At block 504, new cache keys are generated for the new/updated application metadata. As previously described, the cache keys may be generated by applying a hash function to the updated application metadata. The hash function outputs a hash value that operates as the cache key, which is stored in a hash table within the application metadata database and references a particular version or iteration of a set of application metadata stored in the application metadata database.

At block 506, the database server 104 receives an HTTP request (e.g., GraphQL request) from the client device that was generated based on a navigation event (e.g., selecting a hyperlink, selecting a navigation button, providing a URL, providing a character string to a search bar, etc.) received via the UI of the client device. At block 508, the database server prepares an HMTL document for responding to the HTTP request that defines how the browser renders the webpage. At block 508, the database server separates the HTTP request into a primary HTTP request for data and a secondary HTTP request for application metadata. At block 510, the database server queries the application metadata database based on the secondary HTTP request and retrieves one or more cache keys associated with application metadata identified in the secondary HTTP request and transmits the cache keys to the client device. For example, the database server may parse the secondary HTTP request (e.g., GraphQL request) and identify the application metadata corresponding to the request and/or the content requested. The database server may use a hash table to identify the cache keys that correspond to the identified application metadata. The identified keys may be transmitted to the browser of the client device via an HTTP response (e.g., GraphQL response). The client device compares the received cache keys to cache keys stored in the local HTTP cache to determine whether or not the application metadata stored in the local HTTP cache is valid. At block 512, the database server queries the data database to retrieve data associated with the primary HTTP request and transmits the result to the client device as the primary HTTP response (e.g., GraphQL response) to the primary HTTP request (e.g., GraphQL request). The data may include, for example, images to be displayed, text to be displayed, data to be displayed and/or referenced by the data defining how the page is organized, code and/or scripts that are executed when the webpage is rendered, displayed, or interacted with, various files utilized by the webpage, etc.

At block 514, the database server receives from the client device a secondary HTTP request (e.g., GraphQL request) for the application metadata associated with the cache keys that were missing from the local HTTP cache. At block 516, the database server retrieves the application metadata associated with the cache keys that were missing from the HTTP cache by transmitting one or more queries to the application metadata database. For example, the database server may query the application metadata database based on the cache keys that were not found in HTTP cache. Using the hash table of the application metadata database, the cache keys can be used to identify, locate, and retrieve the corresponding sets of application metadata. The database server generates the secondary HTTP response (e.g., GraphQL response) based on the query results received from the application metadata database and transmits the secondary HTTP response (e.g., GraphQL response) to the client device. The client device then renders the webpage based on the received data.

Figure 8:
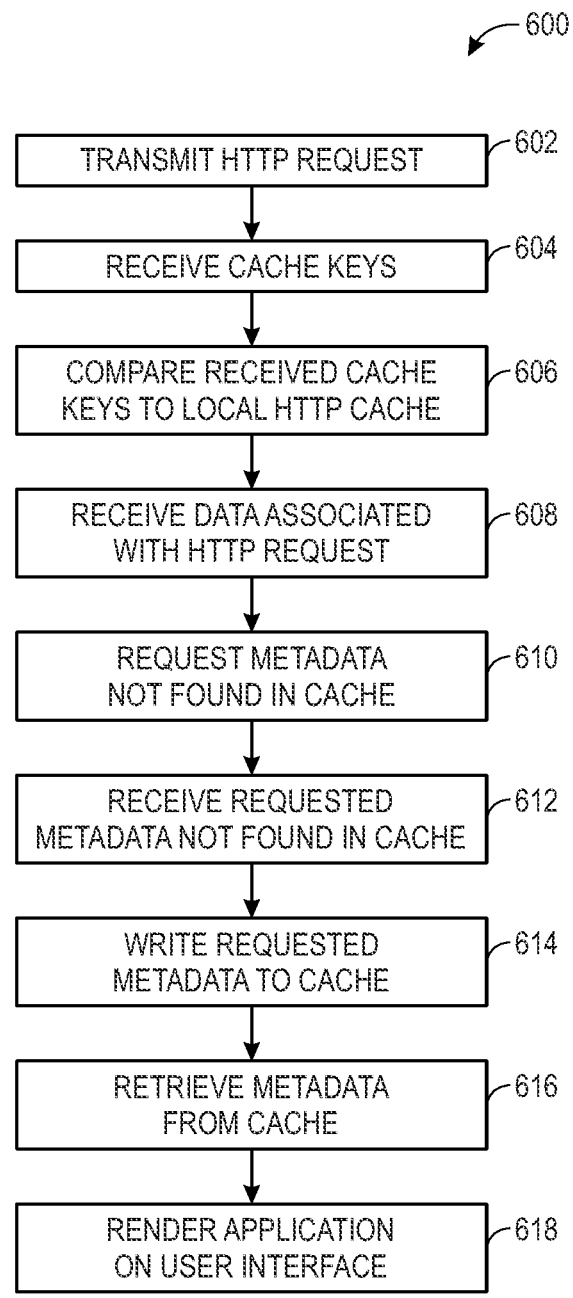
FIG. 8 is a flow chart of a process for managing and delivering application metadata from the perspective of the client device, in accordance with aspects of the present disclosure.

FIG. 8 is a flow chart of a process of caching and requesting application metadata from the perspective of a computing device located client side (e.g., client device 20 shown in FIGS. 1, 5, and 6). At block 602, an input received via the UI of the client device triggers a navigation event, which causes the client device to transmit an HTTP request (e.g., GraphQL request) to the database server for data and/or content to render the webpage. At block 604, the client device receives one or more cache keys for application metadata associated with the HTTP request. At block 606, the client device compares the received cache keys to cache keys stored in a local HTTP cache. The local HTTP cache may include, for example, previously received and cached application metadata that is broken into sets, each set having a respective cache key that identifies a particular version or iteration of the respective set of application metadata. If the received cache keys are found in the cache, the application metadata stored in the local HTTP cache is valid and the application metadata corresponding to the matching cache keys does not need to be fetched. If all of the received cache keys are found in the local HTTP cache, all of the associated application metadata can be retrieved from the local HTTP cache and no application metadata needs to be fetched from the database server. However, if any of the received cache keys are not found in the local HTTP cache, then application metadata associated with the missing cache keys is fetched from the database server.

At block 608, the client device receives the primary HTTP response to the primary HTTP request from the database server, which includes the data associated with the HTTP request. At block 610, the client device transmits an HTTP request (e.g., GraphQL request) to the database server requesting application metadata not found in the local HTTP cache. The HTTP request may identify the requested application metadata via the cache keys not found in the local HTTP cache. At block 612, the client device receives the requested application metadata not found in the local HTTP cache and the corresponding cache keys from the database server as an HTTP response (e.g., GraphQL response) to the secondary HTTP request. At block 614, the client devices writes the new application metadata and cache keys received from the database server to the local HTTP cache. At block 616, all of the application metadata associated with the original HTTP request is retrieved from the local HTTP cache. At block 618, the webpage is rendered on the user interface of the client device using the retrieved application metadata and the received application data.

The present disclosure provides improved techniques for delivering application metadata to a client device across a network. Application metadata may be stored in a database on one or more servers connected to a computing network. The application metadata may be broken up into sets, with each set having a respective cache key that identifies the particular version or iteration of the application metadata set. When a user navigates to a webpage or an application via a browser of a client device connected to the network, the client device sends a Hypertext Transfer Protocol (HTTP) request to the server for the application data and application metadata associated with the webpage or application. The server identifies the application metadata referenced in the HTTP request, retrieves the corresponding cache keys from the application metadata database, and transmits the cache keys to the client device. The client device compares the received cache keys to cache keys stored in a local HTTP cache and identifies any received cache keys that are missing from the local HTTP cache. Meanwhile, the server identifies the application data referenced in the HTTP request, retrieves the corresponding application data from an application data database, and provides the retrieved application data to the client device. If any of the received cache keys are missing from the local HTTP cache, the client device sends a second HTTP request to the server requesting the application metadata associated with the identified cache keys not found in the local HTTP cache. The server retrieves the application metadata corresponding to the cache keys not found in the local HTTP cache from the application database server and transmits the application metadata to the client device. The client device then renders the webpage or application based on the received application data and the application metadata associated with the received cache keys.

By applying the presently disclosed techniques, the amount of metadata fetched when a client device navigates back to a page is significantly reduced, resulting is pages loading faster. Further, when applied to a whole network, the amount of metadata being transmitted across the network is greatly reduced, resulting in less network traffic, and faster network transmission speeds. Accordingly, the disclosed techniques may reduce resources (e.g., power) consumed by the network and reduce the amount of network hardware/infrastructure needed to provide the same performance.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a processor of a server; and
a memory, accessible by the processor, and storing instructions that, when executed by the processor, cause the processor to perform operations comprising:
receiving, from a client device, a first hypertext transfer protocol (HTTP) request for content associated with a webpage;
separating the first HTTP request into a first query for application data and a second query for sets of application metadata, wherein the application data are representative of the content associated with the webpage, and wherein the sets of application metadata include information about the application data;
retrieving, from an application data database, the application data using the first query;
retrieving, from an application metadata database, different from the application data database, a plurality of cache keys associated with respective sets of application metadata identified in the first HTTP request using the second query;
transmitting, to the client device, a first HTTP response identifying the plurality of cache keys associated with the respective sets of application metadata identified in the first HTTP request, wherein the first HTTP response does not contain the application data;
receiving, from the client device, a second HTTP request identifying one or more cache keys of the plurality of cache keys that are not stored in a local HTTP cache of the client device;

retrieving, from the application metadata database, one or more respective sets of application metadata corresponding to the one or more cache keys of the plurality of cache keys identified by the client device; and transmitting, to the client device, a second HTTP response comprising the one or more respective sets of application metadata corresponding to the one or more cache keys of the plurality of cache keys identified by the client device.

2. The system of claim 1, wherein the application metadata database is stored on the memory, and wherein the plurality of cache keys are stored in a hash table within the application metadata database.

3. The system of claim 2, wherein the operations comprise:

receiving an update to a particular set of application metadata stored in the application metadata database;
storing the updated particular set of application metadata in the application metadata database;
generating, in response to storing the updated particular set of application metadata in the application metadata database, a particular cache key for the updated particular set of application metadata; and
storing the particular cache key in the application metadata database.

4. The system of claim 3, wherein generating the particular cache key for the updated particular set of application metadata comprises applying a hash function to the updated particular set of application metadata.

5. The system of claim 4, wherein the particular cache key is stored in the hash table of the application metadata database.

6. The system of claim 1, wherein the operations comprise:

transmitting, to the client device, a third HTTP response comprising the application data corresponding to the first HTTP request.

7. The system of claim 1, wherein at least one of the one or more respective sets of application metadata correspond to updated application metadata associated with a particular user or a particular user role.

8. The system of claim 1, wherein at least one of the plurality of cache keys is stored in the local HTTP cache of the client device and corresponds to a first particular set of application metadata associated with a first particular user or a first particular user role, wherein a second particular set of application metadata associated with a second particular user or a second particular user role has been updated since the at least one of the plurality of cache keys was generated.

9. The system of claim 1, wherein the operations comprise:

receiving, from the client device, a third HTTP request for the content associated with the webpage;
retrieving, from the application metadata database, the plurality of cache keys associated with the respective sets of application metadata identified in the third HTTP request;
transmitting, to the client device, a third HTTP response identifying the plurality of cache keys associated with the respective sets of application metadata identified in the third HTTP request;
retrieving, from the application data database, application data corresponding to the third HTTP request; and
transmitting, to the client device, a fourth HTTP response comprising the application data corresponding to the third HTTP request.

10. The system of claim 1, wherein the sets of application metadata comprise at least one of an authorship associated with the application data, or a time stamp associated with the application data.

11. A method, comprising:

transmitting, from a client device to a database server, a first hypertext transfer protocol (HTTP) request for content associated with a webpage;
wherein the first HTTP request causes the database server to perform actions comprising:
separating, by the database server, the first HTTP request into a first query for application data and a second query for sets of application metadata, wherein the application data are representative of the content associated with the webpage, and wherein the sets of application metadata include information about the application data;
retrieving, by the database server from an application data database, the application data using the first query; and
retrieving, by the database server from an application metadata database, different from the application data database, a plurality of cache keys associated with respective sets of application metadata identified in the first HTTP request using the second query;
receiving, from the database server a first HTTP response comprising the plurality of cache keys associated with respective sets of application metadata identified in the first HTTP request, wherein the first HTTP response does not contain the application data;
identifying one or more cache keys of the plurality of cache keys that are not stored in a local HTTP cache;
transmitting, to the database server, a second HTTP request identifying the one or more cache keys of the plurality of cache keys identified by the client device;
receiving, from the database server, a second HTTP response comprising one or more respective sets of application metadata corresponding to the one or more cache keys of the plurality of cache keys identified by the client device; and
rendering the webpage with the content using the respective sets of application metadata identified in the HTTP request.

12. The method of claim 11, comprising:

writing, to the local HTTP cache, the one or more respective sets of application metadata corresponding to the one or more cache keys of the plurality of cache keys identified by the client device; and
retrieving, from the local HTTP cache, the respective sets of application metadata identified in the first HTTP request.

13. The method of claim 11, comprising: receiving, from the database server, a third HTTP response comprising the application data identified in the first HTTP request.

14. The method of claim 11, comprising:

receiving, via a user interface of the client device, an input navigating to the webpage;
generating a navigation event based on the input; and
generating the first HTTP request based on the navigation event.

15. The method of claim 11, wherein the plurality of cache keys were generated by applying a hash function, and wherein the plurality of cache keys are stored in a hash table on the database server.

16. The method of claim 11, comprising:

transmitting, to the database server, a third HTTP request for the content associated with the webpage;

receiving, from the database server, a third HTTP response identifying the plurality of cache keys associated with the respective sets of application metadata identified in the third HTTP request;

determining that all of the plurality of cache keys associated with the respective sets of application metadata identified in the third HTTP request are stored in the local HTTP cache;

receiving, from the database server, application data corresponding to the third HTTP request;

retrieving, from the local HTTP cache, the respective sets of application metadata identified in the third HTTP request; and rendering the webpage using the application data and the respective sets of application metadata retrieved from the local HTTP cache.

17. The method of claim 11, wherein at least one of the one or more respective sets of application metadata correspond to updated application metadata associated with a particular user or a particular user role.

18. The method of claim 11, wherein at least one of the plurality of cache keys is stored in the local HTTP cache and corresponds to a first particular set of application metadata associated with a first particular user or a first particular user role, wherein a second particular set of application metadata associated with a second particular user or a second particular user role has been updated since the at least one of the plurality of cache keys was generated.

19. A non-transitory, computer readable medium comprising instructions that, when executed by a processor of a server, cause the processor to perform operations comprising:

receiving an update to a set of application metadata stored in an application metadata database;

storing the updated set of application metadata in the application metadata database;

generating, by applying a hash function, a cache key for the updated set of application metadata;

storing the cache key in a hash table of the application metadata database;

receiving, from a client device, a first hypertext transfer protocol (HTTP) request for content associated with a webpage;

separating the first HTTP request into a first query for application data and a second query for sets of application metadata, including the set of application metadata, wherein the application data are representative of the content associated with the webpage, and wherein the sets of application metadata include information about the application data;

retrieving, from an application data database, the application data using the first query;

retrieving, from the application metadata database, different from the application data database, a plurality of cache keys, including the cache key, associated with respective sets of the application metadata identified in the first HTTP request using the second query;

transmitting, to the client device, a first HTTP response identifying the plurality of cache keys associated with the respective sets of application metadata identified in the first HTTP request, wherein the first HTTP response does not contain the application data;

retrieving, from an application database, application data corresponding to the first HTTP request;

transmitting, to the client device, a second HTTP response comprising the application data corresponding to the first HTTP request;

receiving, from the client device, a second HTTP request indicating that the cache key is not stored in a local HTTP cache;

retrieving, from the application metadata database, the updated set of application metadata corresponding to the cache key; and transmitting, to the client device, a third HTTP response comprising the updated set of application metadata corresponding to the cache key.

20. The computer readable medium of claim 19, wherein the updated set of application metadata is associated with a particular user or a particular user role.

* * * * *